US00H002237H

(19) United States
(12) Statutory Invention Registration
Barrett

(10) Reg. No.: US H2237 H
(43) Published: Apr. 6, 2010

(54) EMBEDDED DYNAMIC VIBRATION ABSORBER

(75) Inventor: David John Barrett, Solomons, MD (US)

(73) Assignee: The United States of America as represented by the Secretary of the Navy, Washington, DC (US)

(21) Appl. No.: 11/482,300

(22) Filed: Jun. 26, 2006

(51) Int. Cl.
*F16M 1/00* (2006.01)

(52) U.S. Cl. ..... 267/136; 473/521; 473/537; 188/378

(58) Field of Classification Search ..... 267/136, 267/151, 141, 140.3, 140.4, 259; 473/521, 473/537; 188/378
See application file for complete search history.

(56) References Cited

U.S. PATENT DOCUMENTS 4,678,707 A 7/1987 Shinozaki et al.
6,106,417 A * 8/2000 Umlauft et al. ..... 473/537
6,116,389 A * 9/2000 Allaei ..... 188/378
6,279,679 B1 8/2001 Thomasen
6,700,304 B1 3/2004 Fuller et al.
6,719,503 B1 4/2004 McCalmonrt et al.
6,974,397 B2 * 12/2005 Lammer ..... 473/521
6,976,403 B2 12/2005 Oblizajek et al.
7,131,640 B2 * 11/2006 Knowles et al. ..... 267/136

* cited by examiner

*Primary Examiner*—Michelle (Shelley) Clement
(74) *Attorney, Agent, or Firm*—Mark O. Glut

(57) ABSTRACT

An embedded dynamic vibration absorber that includes an external structural portion and a vibrational absorbing portion. The vibrational absorbing portion is encompassed or surrounded by the external structural portion.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

EMBEDDED DYNAMIC VIBRATION ABSORBER

STATEMENT OF GOVERNMENT INTEREST

The invention described herein may be manufactured and used by or for the Government of the United States of America for governmental purposes without payment of any royalties thereon or therefor.

BACKGROUND

The present invention relates to an embedded dynamic vibration absorber. More specifically, but without limitation, the present invention relates to an embedded dynamic vibration absorber that resides within structural and mechanical components.

Vibrations occur during the normal operation of structural and mechanical systems. These vibrations cause components to experience fatigue and reduced service life. Typically, to neutralize and/or control such effects of vibration, dynamic vibration absorbers are externally attached to structural and mechanical systems.

In particular, such conventional dynamic vibration absorbers are designed to vibrate out of phase, with respect to the vibration of the attached structural or mechanical system. This out of phase vibrational motion of the dynamic vibration absorber produces forces that counteract the vibrations of the attached structural or mechanical system.

Further, such conventional dynamic absorbers, may contain a viscoelastic material, to provide damping. However, the use of such conventional dynamic vibration absorbers presents several problems. For example, external application of such absorbers generally takes place after construction and installation of the structural or mechanical system of interest, entailing significant additional expense and installation time.

In addition, external application of conventional dynamic vibration absorbers exposes the absorbers to the rigors of environmental and service conditions, which frequently lead to damage and degradation of the dynamic vibration absorber. Moreover, conventional dynamic vibration absorbers are generally capable of neutralizing and/or controlling vibration in only one or two axes. Thus, when utilizing conventional dynamic vibration absorbers, many directions of vibration must be analyzed and determined, and then several absorbers installed to attempt to counteract the various axes of vibration.

It is a feature of the invention to provide an embedded dynamic vibration absorber that includes an external structural portion and a vibrational absorbing portion. The vibrational absorbing portion is encompassed or surrounded by the external structural portion.

It is a feature of the invention to provide an embedded dynamic vibration absorber that includes a plurality of structural layers and an embedment. The structural layers are adjacent to each other, and the embedment is embedded between interior layers of the structural layers. The embedment includes a mass element and a viscoelastic material, the viscoelastic material surrounds the mass element.

It is a feature of the invention to provide an embedded dynamic vibration absorber that is free to respond to axial, flexural and torsional vibrations. The embedded dynamic vibration absorber also provides extended vibration control.

It is a feature of the invention to provide an embedded dynamic vibration absorber that provides extended coverage and efficient operation.

It is a feature of the invention to provide an embedded dynamic vibration absorber that is protected from the environment and damage.

It is another feature of the present invention to provide a dynamic vibration absorber capable of neutralizing and/or minimizing vibration in several axes.

It is a further feature of the present invention to provide a dynamic vibration absorbing structure which may be embedded into structures and/or mechanical systems during or after construction thereof, and which provide neutralization and/or damping of vibrational effects of the structures and/or mechanical systems in several axes.

DRAWINGS

These and other features, aspects and advantages of the present invention will become better understood with reference to the following description and appended claims, and accompanying drawings wherein:

DESCRIPTION

Figure 3:
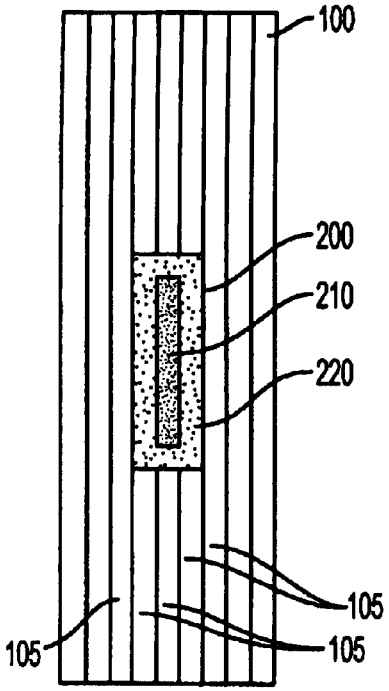
FIG. 3 is an embodiment of the embedded dynamic vibration absorber.
Figure 4:
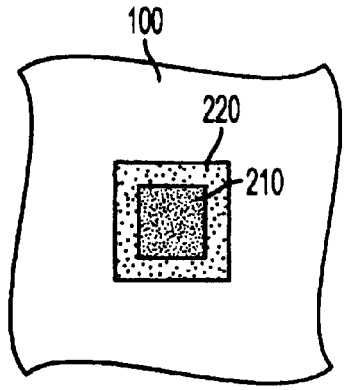
FIG. 4 is a top cross sectional view of embodiment of the embedded dynamic vibration absorber; and, FIG. 5 is a cross sectional view of an embodiment of the embedded dynamic vibration absorber disposed within an axial member.
Figure 5:
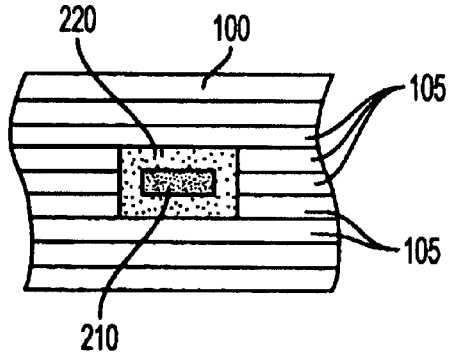

The preferred embodiment of the present invention is illustrated by way of example below and in FIGS. 1–5. The embedded dynamic vibration absorber 1 includes an external structural portion and a vibrational absorbing portion. The vibrational absorbing portion is encompassed or surrounded by the external structural portion. The external structural portion may be plurality of axial structural layers 100 and the vibrational absorbing portion may be an embedment 200. As shown in FIGS. 3, 4 and 5, the axial structural layers 100 are adjacent to each other, and the embedment 200 is embedded between interior layers 105 of the axial structural layers 100. The embedment 200 includes a mass element 210 and a viscoelastic material 220, the mass element 210 is encompassed or surrounded by the viscoelastic material 220.

In the description of the present invention, the invention will be discussed in a construction environment; however, this invention can be utilized for any type of need that requires use of a damper or vibration absorber. The embedded dynamic vibration absorber 1, as well as the dynamic vibration absorbing structure herein, have numerous applications including, but not limited to: composite enclosures for equipment; composite racks; structural parts; sports equipment (tennis rackets, snow boards, golf clubs, hockey sticks, etc.); composite civil engineering structures (bridges, decks, supports, frames, etc.); and composite mechanical components (pipes, pumps, vessels, containers, etc.).

Figure 1:
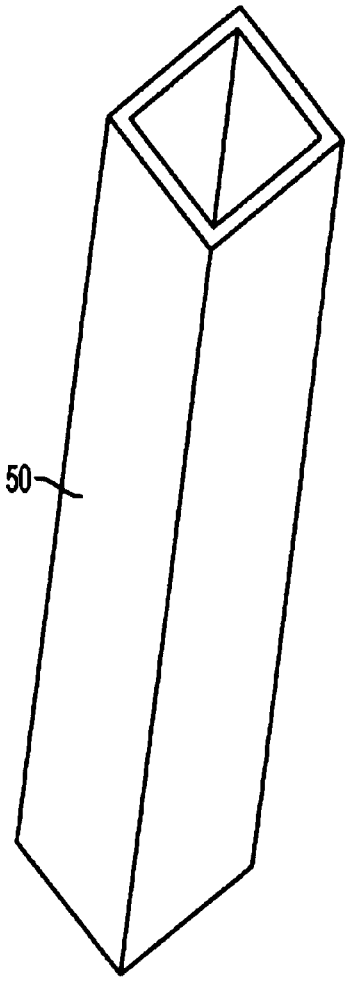
FIG. 1 is a basic axial member with an embodiment of the embedded dynamic vibration absorber.
Figure 2:
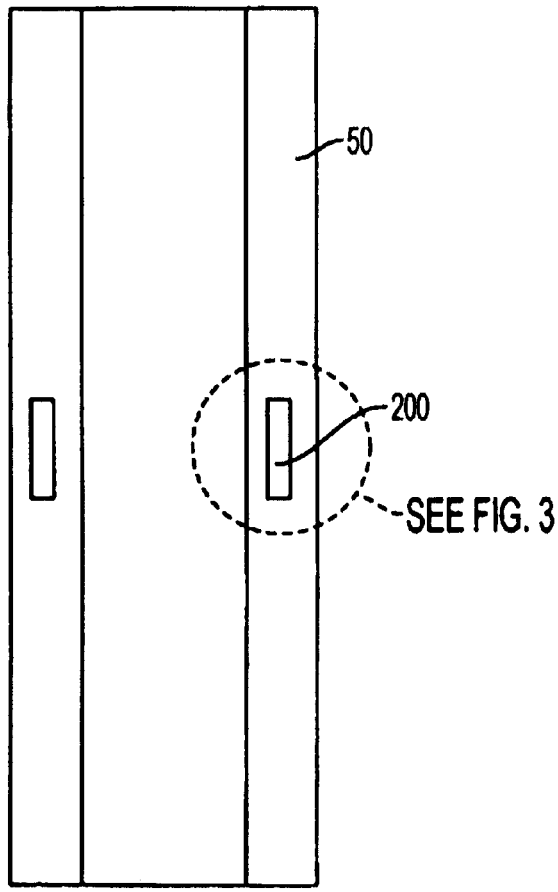
FIG. 2 is a cross-sectional view of a basic axial member with an embodiment of the embedded dynamic vibration absorber disposed within the member.

FIGS. 1 and 2 show a basic axial member 50. Typically, a basic axial member 50 is made of a plurality of axial structural layers 100. An axial structural layer may be described as, but without limitation as, a structural member that resists loads along its length. Examples, but without limitation, of an axial structural layer are: a column, a post, a strut, a truss member and an equipment support. The basic axial members 50 may be, but without limitation, in the shape of a circular tube or cylinder, a polygon tube (a square hollowed tube is shown in FIGS. 1 and 2), a solid circle, and a wide flange or angle. The basic axial member 50 may be in any shape practicable. The external structural portion or axial structural layers 100 may be, but without limitation, constructed from metals, wood, structural plastics, advanced composites, a lamination of wood or composite materials, fiberglass, or combinations thereof. Examples of advanced composites that may be used include, but without limitation, graphite epoxy, Kevlar Epoxy and glass epoxy.

As seen in FIG. 3, the axial structural layers 100 are adjacent to each other or substantially longitudinally parallel (their respective axes substantially parallel). Several of the axial structural layers 100 are interior layers 105. Interior layers 105 may be defined, but without limitation, as being within, inside, or not in direct communication with the exterior or the outside environment.

As seen in FIGS. 3 and 5, the embedment 200 is embedded between interior layers 105 of the axial structural layers 100. The mass element 210 is substantially completely surrounded by the viscoelastic material 220.

A viscoelastic material 220 may be defined, but without limitation, as a material possessing both viscous and elastic behavior or a material that is plastically deformable or having the ability to dissipate vibration by converting kinetic energy to heat. The viscoelastic material 220 may be, but without limitation, an acrylic polymer, an elastomer, a polymer, an adhesive, rubber, any polyvinyl chloride alloy compound, a vulcanized polyolefinite thermoplastic rubber, urethane foams, a thermoplastic, or combinations of the above.

In operation, by "floating" within the viscoelastic material 220, the mass element 210 vibrates out of phase with the rigid external structural portion or axial structure layers 100, to counteract the vibration thereof. In general, the mass element 210 may be any material having a density greater than the density of the material constituting the viscoelastic material 220. Generally, iron or lead is used, as is it inexpensive and readily available. The mass element 210 may be, but without limitation, constructed from metals, wood, structural plastics, advanced composites, viscous liquids, gels, or any material practicable. Examples of advanced composites that may be used include, but without limitation, graphite epoxy, Kevlar Epoxy and glass epoxy. However, any viscous liquids or gels, capable of being contained within the viscoelastic material 220 may be utilized.

The embedded dynamic vibration absorber 1 may be manufactured, but without limitations, by using the following method: placing the first ply of prepreg on a lay-up tool; forming the ply to the surface contour of the tool; removing any wrinkles using a clean adhesive spreader; placing the second ply upon the first ply, and then following the above procedure and repeating ply lay down until the layer to contain the dynamic vibration absorber is reached, so as to construct a lay-up. Then the next steps include: applying viscoelastic (damping) material to the surfaces of the internal portion (internal mass portion 210), so as to encompass the mass portion 210; placing the mass on the lay-up in the desired location, so as to constitute a portion of the embedded mass layer; filling out the embedded mass layer with sized pieces of prepreg; then finishing the piece by continuing adding plies until the desired thickness is achieved. The absorber is then cured following the process schedule for the prepreg material.

When introducing elements of the present invention or the preferred embodiment(s) thereof, the articles "a", "an", "the" and "said" are intended to mean there are one or more of the elements. The terms "comprising," "including," and "having" are intended to be inclusive and mean that there may be additional elements other than the listed elements.

Although the present invention has been described in considerable detail with reference to a certain preferred embodiment thereof, other embodiments are possible. Therefore, the spirit and scope of the appended claims should not be limited to the description of the preferred embodiment(s) contained herein.

What is claimed is:

1. An embedded dynamic vibration absorber, comprising:

an external structural portion; and, a vibrational absorbing portion, the vibrational absorbing portion encompassed by the external structural portion.

2. An embedded dynamic vibration absorber, comprising:

a plurality of structural layers, the structural layers adjacent to each other;

an embedment, the embedment embedded between interior layers of the structural layers, the embedment comprising of a mass element and a viscoelastic material, the viscoelastic material surrounding the mass element.

3. The embedded dynamic vibration absorber of claim 2, wherein the mass element is a material having a density greater than the density of the viscoelastic material.

4. An embedded dynamic vibration absorber, comprising:

a plurality of axial structural layers, the axial structural layers adjacent to each other;

an embedment, the embedment embedded between interior layers of the axial structural layers, the embedment comprising of a mass element and a viscoelastic material, the viscoelastic material surrounding the mass element, the mass element being a material having a density greater than the density of the viscoelastic material.

5. The embedded dynamic vibration absorber of claim 4, wherein the viscoelastic material is selected from a material in the group consisting of acrylic polymer, an elastomer, a polymer, an adhesive, rubber, a polyvinyl chloride alloy compound, a vulcanized polyolefinine thermoplastic rubber, a urethane foam, and a thermoplastic.

6. The embedded dynamic vibration absorber of claim 5, wherein the axial structural layers are manufactured from a material selected from the group consisting of metal, wood, structural plastic, advanced composite, a lamination of wood, composite materials, and fiberglass.

7. The embedded dynamic vibration absorber of claim 6, wherein the mass element is manufactured from a material selected from the group consisting of metal, wood, structural plastics, advanced composites, viscous liquid, and gel.

* * * * *